3,089,901
PRODUCTION OF METHYL METHACRYLATE
USING ALKALI METAL BORATE CATALYST
James F. Vitcha, New Providence, and Victor A. Sims, Bayonne, N.J., assignors to Air Reduction Company, Incorporated, New York, N.Y., a corporation of New York
No Drawing. Filed June 29, 1961, Ser. No. 120,518
7 Claims. (Cl. 260—486)

This invention relates to the synthesis of methyl methacrylate. More particularly, it relates to an improved catalytic vapor phase synthesis of methyl methacrylate by condensing methyl propionate with formaldehyde.

Methyl methacrylate is used extensively in the manufacture of synthetic resinous polymers and because of a steadily increasing demand for methyl methacrylate, two recently patented processes are of particular interest, namely, Redmon U.S. Patent No. 2,734,074 and Etherington U.S. Patent No. 2,821,543.

The present invention constitutes an improvement over the prior art such as that represented by these two patents, and resides in the discovery of an improved process for obtaining methyl methacrylate which comprises contacting a vapor mixture of methyl propionate and formaldehyde with an alkali metal borate catalyst. Especially good results are obtained with sodium and potassium metaborates impregnated on silica gel. The catalyst preferably contains about 5 to 20% by weight of alkali metal metaborate. The use of silica gel as the support is critical, since inferior results are obtained with other supports.

The process by which methyl methacrylate is formed according to the process of the present invention may be represented by the following overall reaction:

$$HCHO + CH_3CH_2COOCH_3 \rightarrow CH_2\!:\!C(CH_3)COOCH_3 + H_2O$$

which probably proceeds via the formation of an intermediate hydroxyester which then loses a molecule of water to yield the desired methyl methacrylate.

Various commercial sources of formaldehyde such as aqueous, alcoholic, or other solutions can be used in the practice of this invention in place of the pure anhydrous materials preferred by the prior art patentees noted above.

The reaction proceeds best at about 325° to 425° C., and preferably at 350° to 400° C., using an excess of ester to formaldehyde and at space velocities over a wide range of about 200 to about 6000 liters/hour/liter of catalyst. In general, higher space velocities (i.e., shorter contact times) are used at the higher operating temperatures and pressures.

Ester/formaldehyde molar ratios varying over rather wide ranges from about 2.5:1 to about 50:1 may be employed, although best results are obtained at ratios of about 5:1 to about 15:1. Within this preferred range high conversions and yields are obtained without excessive dilution of the reaction product with unreacted methyl propionate. The reaction proceeds well at substantially atmospheric pressure, although one may resort to superatmospheric or subatmospheric pressures if desired. The use of pressure facilitates recovery of methyl methacrylate. Generally no advantages are gained at pressures above 200 p.s.i.g. which are not also realized at lower pressures.

A number of various catalysts and catalyst supports were investigated in a reaction system comprising a calibrated reservoir, metering pump, vaporizer, carburetor, preheater, catalyst tube, condensing system and wet test meter all connected in series. In operation a suitably proportioned mixture of vapors of methyl propionate and formaldehyde—and methanol and/or water vapor, when these were also present in the raw materials used—was led through an electrically heated and insulated tube to a preheated tube having a temperature-controlled electrical heating jacket. The preheated vapors passed directly from the preheater to a catalyst-packed reactor tube wherein the temperature was maintained as uniform as possible. The vapors issuing from the discharge end of the reactor tube were led to a condensing system including cold traps and suitable apparatus to measure and analyze the off-gas.

Before each run the system was flushed with inert gas, then each unit was brought to the desired temperature, and the flow of the mixture of reactants into the apparatus was then initiated.

The methyl methacrylate is recovered from the condensate by fractional distillation under reduced pressure, or any other suitable technique.

In accordance with the present invention, it has been found that methyl methacrylate can be readily obtained in high yields by vapor phase condensation of formaldehyde and methyl propionate provided that the catalyst employed consists essentially of an alkali metal metaborate selected from the group consisting of sodium metaborate and potassium metaborate, supported on silica gel.

This invention will now be further illustrated in detail with respect to the example which follows:

EXAMPLE

A vapor mixture of methyl propionate and aqueous formaldehyde in a mole ratio of 14:1 was passed through a catalyst-filled reactor tube at atmospheric pressure and a temperature of 375° C. The formaldehyde used was either a commercial aqueous solution containing 36 to 38% HCHO, 10 to 15% methanol as a preservative, balance water, or a commercial methanolic solution containing 55% formaldehyde in methyl alcohol with about 10% water, as indicated in Table I below. A number of runs using different catalysts were made. The catalysts are shown in Table I below. Also shown in Table I are the space velocities in liters/hour/liter of catalyst, the percentage (by weight) of methyl methacrylate in the reaction product, and the percentage conversion and percentage yield, both based on formaldehyde.

*Table I*

| Run No. | Catalyst | Formaldehyde Solvent | Percent Conv. | Percent Yield |
|---|---|---|---|---|
| 1 | 20% Sodium metaborate on silica gel. | Water | 47 | ---------- |
| 2 | 10% Sodium metaborate on silica gel. | Methanol | 39 | 78 |
| 3 | 20% Potassium metaborate on silica gel. | Water | 39 | 53 |
| 4 | 10% Sodium tetraborate on silica gel. | ---do--- | 34 | ---------- |

When sodium metaborate is supported on materials other than silica gel, such as alumina, magnesia, synthetic zeolites, boron oxide, etc., the conversions are very low, generally about 0 to 13% based on a formaldehyde.

For comparison other metal borates were tried with lower yields and conversions than those obtained with the alkali metal metaborate and also with corresponding lower concentrations of methacrylate in the condensate. Results are given in Table II below. Formalin was used as the formaldehyde source in these runs.

Table II

| Run No. | Catalyst | Percent Conv. |
|---|---|---|
| 5 | 20% Ba orthoborate on silica gel | 9 |
| 6 | 10% Boron oxide on silica gel | <1 |

The catalysts used in the practice of this invention may be conveniently prepared as follows: An aqueous solution of sodium or potassium metaborate is poured onto a suitable amount of silica gel (6/16 mesh) particles with stirring, and the resulting mass is warmed gently while being mixed. Thereafter, the heat is increased and finally the mixture is held in a forced air draft oven at 375° C. for about three hours. Any fines are screened out and discarded.

While preferred embodiments of the invention have been described above, it is not intended that the invention be limited thereby except as required by the appended claims.

We claim:

1. A process for the synthesis of methyl methacrylate which comprises contacting a vapor mixture comprising methyl propionate and formaldehyde with an alkali metal borate catalyst selected from the group consisting of alkali metal meta borates on silica gel and alkali metal tetra borates on silica gel, at a temperature of 325° C. to 425° C., and recovering methyl methacrylate from the resulting products.

2. The process of claim 1 wherein the catalyst is sodium meta borate on silica gel.

3. The process of claim 1 wherein the catalyst is potassium meta borate on silica gel.

4. The process of claim 1 wherein the catalyst comprises about 5% to about 20% by weight of said borate on silica gel.

5. The process of claim 1 wherein the mole ratio of methyl propionate to formaldehyde is between about 2.5:1 and 50:1.

6. The process of claim 2 wherein the temperature is between about 350° C. and 400° C., and where the mole ratio of methyl propionate to formaldehyde is between about 5:1 and 15:1.

7. The process of claim 3 wherein the temperature is between about 350° C. and 400° C., and where the mole ratio of methyl propionate to formaldehyde is between about 5:1 and 15:1.

References Cited in the file of this patent

UNITED STATES PATENTS

| 2,734,074 | Redmon | Feb. 7, 1956 |
| 2,821,543 | Etherington | Jan. 28, 1958 |
| 3,014,958 | Koch et al. | Dec. 26, 1961 |